United States Patent [19]

Renner et al.

[11] 4,108,507
[45] Aug. 22, 1978

[54] THROUGH-WALL CABLE SUPPORT

[75] Inventors: Wolf Renner, Giessen; Dieter Mauer, Lollar, both of Fed. Rep. of Germany

[73] Assignee: USM Corporation, Farmington, Conn.

[21] Appl. No.: 748,200

[22] Filed: Dec. 7, 1976

[30] Foreign Application Priority Data

Dec. 17, 1975 [DE] Fed. Rep. of Germany ....... 2556878
Dec. 17, 1975 [DE] Fed. Rep. of Germany ... 7540233[U]

[51] Int. Cl.² ............................................. F16C 27/00
[52] U.S. Cl. ................................ 308/238; 174/65 G; 174/153 G; 248/56; 339/103 R
[58] Field of Search ................ 285/159, 205; 339/103; 308/237, 1 R, 238, DIG. 7, DIG. 8; 174/153 G, 65 G, 152 G; 16/2-3, DIG. 33; 403/225, 224; 85/DIG. 2, 81; 248/56, 27.1

[56] References Cited

U.S. PATENT DOCUMENTS

| 3,056,852 | 10/1962 | Sachs | 339/103 B X |
| 3,843,833 | 10/1974 | Nicholson | 248/56 X |
| 4,033,535 | 7/1977 | Moran | 248/56 |

Primary Examiner—Trygve M. Blix
Assistant Examiner—Douglas C. Butler
Attorney, Agent, or Firm—Aubrey C. Brine; Richard B. Megley; Vincent A. White

[57] ABSTRACT

A plastics strain relief bushing for a cable passing through a hole in a panel, comprising a hollow body for insertion in the hole and having a head to engage one side of the panel and retainer to engage the other side and prevent its withdrawal. A locking member rotatable in a non-cylindrical hole in the body has at least one resilient finger which is urged by the wall of the hole into gripping engagement with the cable when the member is rotated through part of a revolution, and is released on further rotation.

8 Claims, 3 Drawing Figures

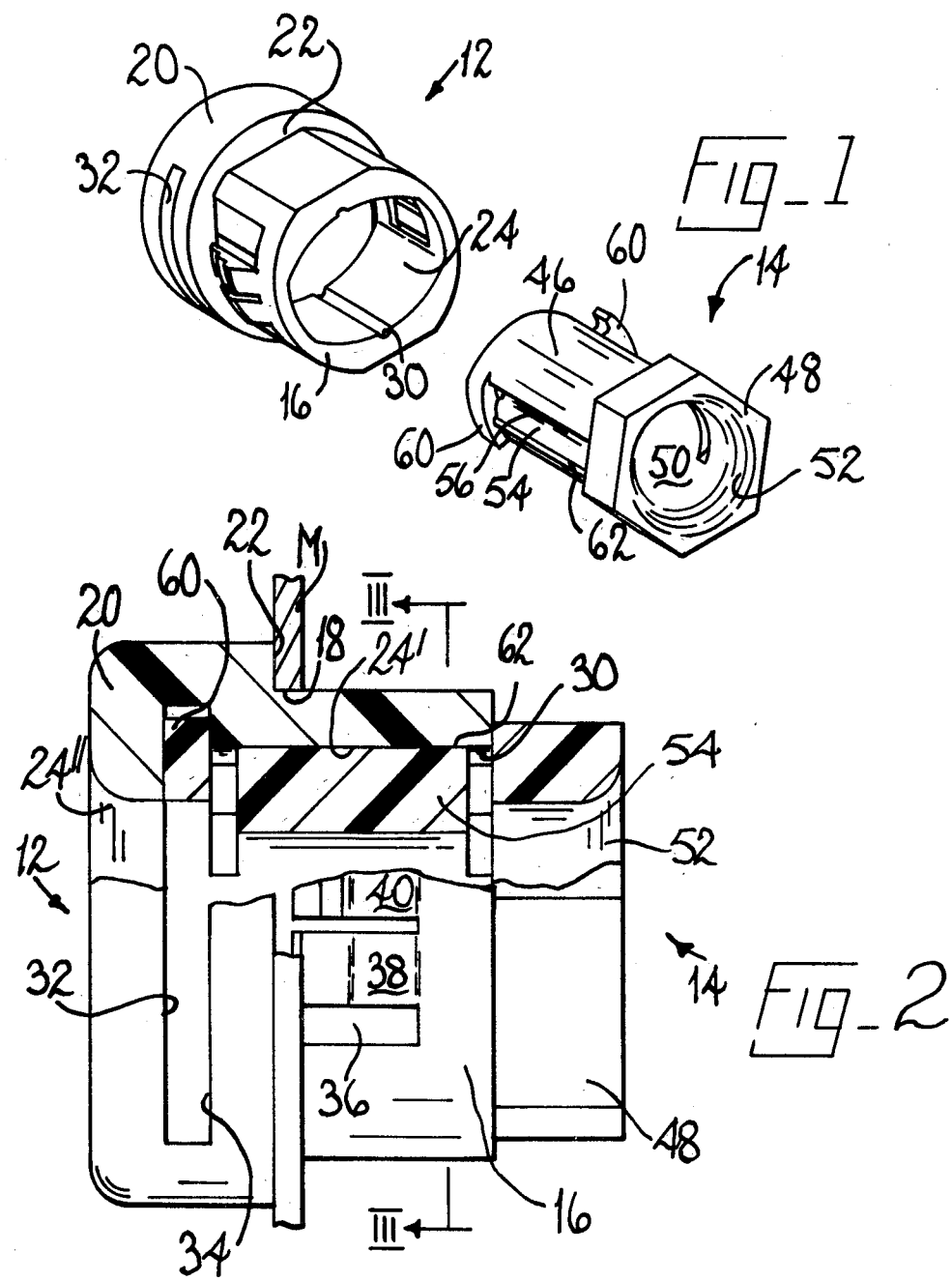

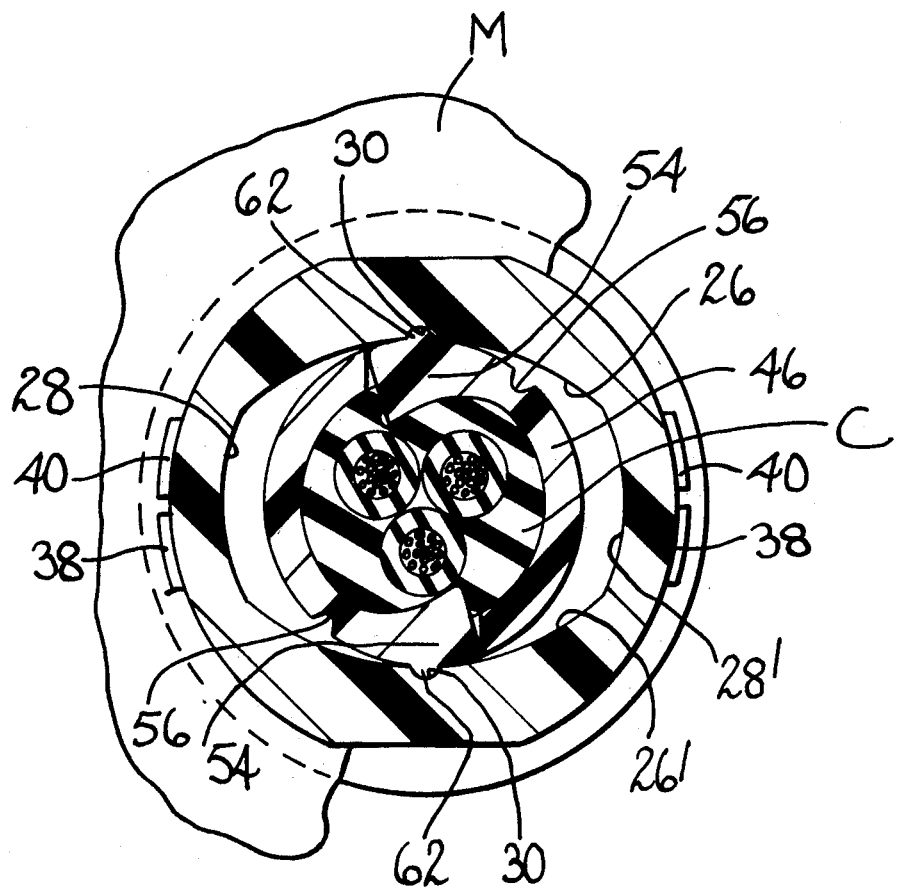
Fig_3

THROUGH-WALL CABLE SUPPORT

BACKGROUND OF THE INVENTION

It is a common practice, where an electric cable or fluid hose has to pass through a hole in a metal panel, to provide in the hole a plastics bushing which is arranged to grip the cable or hose firmly so that tension applied to the cable or hose at one side of the panel will not be transmitted to the other. It is also known to make the hole in the panel other than round, and for the bushing to have a complementary external cross-section so that torque applied to the cable or hose at one side of the panel will likewise not be transmitted to the other.

A strain relief bushing is known which can be inserted in a non-circular hole in a panel to permit a cable or hose to be threaded through it and the cable or hose then gripped by a ratchet-like tooth hinged in an aperture at one side of the bushing and bearing on a flexible finger which is caused to press against and grip the cable or hose. A shortcoming of this arrangement is that the grip of the bushing on the cable or hose cannot be released as readily as may be desirable.

SUMMARY OF THE INVENTION

In view of the foregoing it is a main object of this invention to provide an improved strain relief bushing which overcomes the foregoing shortcomings and which can readily be inserted in a hole in a panel from one side and securely retained therein, permitting a cable or hose to be subsequently threaded through it, and which thereafter can be locked to grip the cable or hose firmly and yet readily released if desired.

To this end, and as herein illustrated, the invention features a strain relief bushing comprising a hollow body which has a shank of non-circular external cross-section for insertion into a complementary shaped hole in a panel and has an enlarged head to engage the panel at one side and retaining means to engage the panel at the other side. The bushing also comprises a locking member arranged to be brought into gripping engagement with a cable or hose threaded through the bushing, the locking member being rotatably mounted in the body and having at least one movable finger which, by engagement with the wall of a non-circular bore of the body is forced, upon rotation of the locking member through part of a revolution, into said gripping engagement.

Preferably, the strain relief bushing has two diametrically opposed fingers which bear on opposite sides of the cable or hose, and each has a longitudinal ridge which seats in one of two longitudinal grooves in the inside wall of the body when in gripping engagement with the cable or hose to prevent accidental release of the grip. Preferably, also, such grip can be released to permit adjustment or removal of the cable or hose upon further rotation of the locking member in the same direction.

Preferably, also, the locking member projects from the end of the shank of the body of the bushing opposite the head, but it is there confined within the cross-sectional area of the shank so that the bushing can be inserted in the hole in the panel with the locking member already assembled in the body. Smoothly curved mouths of co-axial bores in the body and locking members avoid the need to reinforce the cable or hole at the locality of exit from the bushing, whichever way round the bushing may have been assembled in the panel. Flats on the projecting portion of the locking member, for example to afford an hexagonal periphery, may be provided to permit rotation of the member by a spanner.

A strain relief bushing in accordance with the invention can readily be inserted in a hole in a panel from one side and securely retained there, permitting a cable or hose to be subsequently threaded through it and thereafter gripped and released by rotation of the locking member.

BRIEF DESCRIPTION OF THE DRAWINGS

The foregoing and other features of the invention will now be more particularly described in connection with an illustrative strain relief bushing and with reference to the accompanying drawings thereof, in which:

FIG. 1 is a view in perspective of a bushing according to the invention showing two parts thereof before assembly together;

FIG. 2 is a view, with parts broken away, of the bushing of FIG. 1, with the two parts assembled in a hole in a panel, (a cable gripped by the bushing being omitted for the sake of clarity); and FIG. 3 is a view in section on the line III—III of FIG. 2.

DESCRIPTION OF THE PREFERRED EMBODIMENT

The strain relief bushing selected as an example of the invention consists of a body 12 and a locking member 14 (FIG. 1) both preferably, but not necessarily, made by injection moulding of a suitable thermoplastic material, for example nylon (e.g. that sold under the trade mark ZYTEL).

The body 12 of this bushing comprises a shank 16 the outer periphery of which presents two parallel faces joined by arcs of a circle so that when the shank is inserted in a hole 18 in a panel M (FIG. 2) of similar outline, the body 12 will not rotate. At one end of the shank is an enlarged head 20, an annular flange 22 of which abuts one side of the panel.

The body 12 is hollow, having a bore 24 through it, part 24' of which, extending from the end opposite the head 20, is defined by four symmetrically disposed walls. One opposing pair of walls 26,26' form parts of a cylinder but are closer together than the cylinder's diameter. The other opposing pair of walls 28,28' form parts of a cylinder of smaller radius and having a common axis. The result is a bore of substantially oval cross-section. The opposing walls 28,28' constitute more than half of the periphery of the bore 24, and have centrally disposed longitudinal grooves 30 for a locking purpose as later described.

At its head end, the bore 24 of the body 12 is circular in cross-section and flares arcuately to provide a smoothly curved mouth 24", the minimum diameter of which is less than the minimum transverse dimension of the part 24'. Between the mouth 24' and the part 24' is a transverse slot 32 which opens into the head 20 from one side (the same side as the wall 28) and provides a retaining shoulder 34 (for a purpose which will appear hereinafter) which extends right around the part 24 of the bore.

Each of the walls 28,28' of the shank 16 has a rectangular opening 36 in each of which are accommodated two resilient retainers 38,40, integral with the edge of the opening farthest from the head 20. Preferably, as shown, the retainer 38 has one ratchet tooth, and the retainer 40 has two; they project beyond the outer wall of the shank 16 so that one pair of teeth (i.e. one at each side of the shank) can engage the opposite side of the panel M from the head, the three pairs of teeth enabling the body to be readily inserted into and retained in panels of different thicknesses. Alternatively, other means for retaining the body in the hole may be provided instead of the particular configuration of retainers shown.

The locking member 14 of the illustrative bushing has a hollow shank 46 and an hexagonal head 48; the shape of the head is determined by the means it is intended to use to rotate it, and may be varied accordingly. A bore 50, which extends right through the locking member, is substantially cylindrical in a relaxed condition of the member and opens at the head end in a smoothly curved mouth 52 similar to the mouth 24" of the body 12.

The shank 46 is constituted in part by two fingers 54 hinged at longitudinally disposed necks 56 where the material of the shank is of reduced thickness by virtue of longitudinal grooves in the outer wall of the shank, the fingers being accommodated in rectangular openings in the wall so that they can flex about the necks 56. The fingers 54 are symmetrically disposed about the axis of the locking member, and each increases in thickness from the neck 56, its outer wall projecting from the otherwise cylindrical wall of the shank. The diameter of the cylindrical part of the outer wall of the shank is slightly less than the distance between the central portions of the walls 26,26' of the body, and the outer edges of the fingers 54, in the relaxed condition of the locking member, are not quite as far apart as the central portions of the walls 28,28', so that the locking member can be inserted without difficulty into the bore 24 of the body when oriented with the outer edges of the fingers aligned with the middle of the walls 28,28'. When thus inserted, two outwardly directed lugs 60 at the end of the shank 46 opposite the head 48 come into register with the slot 32, the lugs yielding sufficiently for them to pass through the bore 24 and clicking into overlapping engagement with the retaining shoulder 34 to prevent inadvertent separation of the body and locking member. The head 48 of the locking member is wholly within the periphery of the shank 16 of the body so that the bushing can be inserted in the panel M after assembly of its two parts.

Thus assembled and inserted in a complementarily shaped hole in the panel M, the illustrative bushing is ready to receive a cable C (FIG. 3). The curved mouths 24", 52 at both ends of the bushing enable it to be inserted into the panel from whichever side is most convenient, the bell-shaped mouths eliminating the need for reinforcement of the cable where it emerges from the bushing.

After threading the cable C through the bushing and adjusting it lengthwise, the locking member 14 may be rotated clockwise (viewing FIG. 3) through 90° to bring it into the position, relative to the body, indicated in FIG. 3 (The locking member is shown in the same position in FIG. 2, but the cable is omitted for the sake of clarity.). In thus rotating the locking member, conveniently by means of a spanner engaging the head 48, the fingers 54 are forced inwardly towards one another by the walls 26,26' until longitudinal ridges 62 become seated in the grooves 30 of the body. At such time, the fingers firmly grip the cable by pressing against it from opposite sides. The locking members resist any attempt to release the cable by reverse rotation, but the cable can be released by rotation of the locking member through a further 90° clockwise with the aid of a spanner, whereupon the fingers recover their relaxed positions and permit the cable to be withdrawn.

Alternatively, if desired, the cable can be threaded through the bushing first, and then the bushing inserted in the hole in the panel, before or after rotating the locking member to grip the cable.

Having thus described our invention, what we claim as new and desire to secure by Letters Patent of the United States is:

1. A cable strain relief bushing for insertion into a non-circular opening forming in a panel, comprising; a body having an outer surface which in cross section forms a shape complementary to the panel opening, an enlarged head located at one end of said body to engage one side of the panel, and having retaining means disposed on said body outer surface to engage the opposite side of said panel, said body further having a non-circular bore formed therethrough, and a locking member having wall structure defining a bore therethrough for receiving a cable, said member having at least one movable finger hingedly supported adjacent an opening formed through said locking member wall structure for movement of said finger into said locking member bore through said opening, said body non-circular bore having a minimum cross-section dimension and a maximum cross-sectional dimension and said finger extending from said locking member wall structure to define a maximum cross-sectional dimension of said locking member less than said body member bore maximum cross-section and greater than said body member bore minimum cross-section, whereby rotation of said locking member inserted into said body bore is effective to move said finger through said wall structure opening to contact and grip a cable disposed in said locking member bore.

2. A bushing as set forth in claim 1 wherein said finger and said body member bore include means for engagement therebetween in the rotated condition to inhibit further rotation of said locking member relative to said body bore.

3. A bushing as set forth in claim 2 wherein said engagement means comprises a ridge formed longitudinally on said finger with respect to said body bore and a mating groove formed on said body bore at the minimum cross-section thereof for engagement with said ridge.

4. A bushing as set forth in claim 1 wherein a second movable finger is disposed on an opposite side of said locking member from said one finger, said second finger being hingedly supported adjacent a second opening formed in said locking member wall structure for movement into said locking member bore through said second opening and wherein said fingers extend from said wall structure to define a maximum cross-sectional dimension of said locking member less than said body bore maximum cross-section and greater than said body bore minimum cross-section whereby rotation of said locking member inserted into said body bore is effective to move said fingers through the respective openings formed in said locking member wall structure to contact and grip the cable disposed in said locking member bore.

5. A bushing as set forth in claim 4 wherein each of said fingers has a ridge thereon formed longitudinally with respect to said body bore and said body bore is provided with a pair of opposed grooves formed therein at the minimum cross-section thereof for engagement with said finger ridges with said fingers in the gripping position, to inhibit rotation of said locking member in said body.

6. A locking member as set forth in claim 5 wherein each of said fingers is provided with means for locking engagement with said mating structure bore when said locking member is in the cable gripping condition.

7. A cable locking member for insertion into a mating structure having a bore formed by four symmetrically disposed arcuate walls wherein one pair of opposed walls define a maximum cross-sectional dimension of the bore and the other pair of opposed walls define a minimum cross-sectional dimension of the bore, said locking member having wall structure defining a bore therethrough for receiving a cable, at least one movable finger hingedly supported adjacent an opening formed through said locking member wall structure for movement of said finger into said locking member bore through said opening, said finger extending outwardly from said locking member wall structure to define a maximum cross-sectional dimension of said locking member less than said mating structure bore maximum cross-section and greater than said mating structure bore minimum cross-section whereby rotation of said locking member inserted in said mating structure bore is effective to move said finger through said opening in said locking member to contact and grip the cable disposed in said locking member bore.

8. A cable locking member as set forth in claim 7 wherein a second movable finger is disposed on an opposite side of said locking member wall from said one finger, said second finger being hingedly supported adjacent a second opening formed in said locking member wall structure for movement into said locking member bore through said second opening and wherein said fingers extend from said wall structure to define a maximum cross-sectional dimension of said locking member structure less than said mating structure bore maximum cross-section and greater than said mating structure bore minimum cross-section whereby rotation of said locking member inserted in said mating structure bore is effective to move said fingers through the respective openings formed in said locking member wall structure to contact and grip the cable disposed in said locking member bore.

* * * * *

UNITED STATES PATENT AND TRADEMARK OFFICE
CERTIFICATE OF CORRECTION

PATENT NO. : 4,108,507
DATED : August 22, 1978
INVENTOR(S) : Renner et al

It is certified that error appears in the above-identified patent and that said Letters Patent is hereby corrected as shown below:

Column 4, line 12, delete the word "forming" and insert the word --formed--.

Signed and Sealed this

Third Day of April 1984

[SEAL]

Attest:

GERALD J. MOSSINGHOFF

Attesting Officer

Commissioner of Patents and Trademarks